US007117336B2

(12) United States Patent
Mimatsu et al.

(10) Patent No.: US 7,117,336 B2
(45) Date of Patent: Oct. 3, 2006

(54) COMPUTER SYSTEM FOR MANAGING STORAGE AREAS IN A PLURALITY OF STORAGE DEVICES

(75) Inventors: Yasuyuki Mimatsu, Yokohama (JP);
Naoto Matsunami, Hayama (JP);
Manabu Kitamura, Yokohama (JP);
Kenji Muraoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/232,691

(22) Filed: Sep. 3, 2002

(65) Prior Publication Data

US 2003/0204701 A1 Oct. 30, 2003

(30) Foreign Application Priority Data

Apr. 26, 2002 (JP) ............................. 2002-125171

(51) Int. Cl.
*G06F 12/00* (2006.01)
*G06F 12/06* (2006.01)
*G06F 12/08* (2006.01)

(52) U.S. Cl. ..................... 711/202; 711/6; 711/206; 711/207

(58) Field of Classification Search ............... 711/203, 711/206, 207
See application file for complete search history.

(56) References Cited

U.S. PATENT DOCUMENTS 5,611,069 A * 3/1997 Matoba .................. 711/114

| 6,779,083 B1* | 8/2004 | Ito et al. ............. 711/114 |
| 2002/0029359 A1* | 3/2002 | Kiyoi et al. ............ 714/45 |
| 2002/0032835 A1* | 3/2002 | Li et al. ................ 711/114 |

FOREIGN PATENT DOCUMENTS

JP 2001142648 5/2001

\* cited by examiner

*Primary Examiner*—Mano Padmanabhan
*Assistant Examiner*—Midys Rojas
(74) *Attorney, Agent, or Firm*—Mattingly, Stanger, Malur & Brundidge, P.C.

(57) ABSTRACT

The present invention, in a computer system where multiple computers share multiple external storage devices, is to control the external storage devices of different control methods in a unified manner. A storage managing program, which manages the storage areas in the unified manner, includes a device control library providing control programs to control the various external storage devices, and a device information database identifying the external-storage-device controlling programs, and manages the multiple external storage devices of different control methods: Also, when a host computer releases an unnecessary storage area, a LU that no host computers use is deleted in the external storage device, and managed as an unused area can be created a new LU.

13 Claims, 9 Drawing Sheets

FIG.2

| DEVICE IDENTIFIER | INFORMATION ACQUIRING FUNCTION | LU CREATING FUNCTION | PATH CREATING FUNCTION | LU DELETING FUNCTION | LUN-SECURITY SETTING-UP FUNCTION |
|---|---|---|---|---|---|
| A | Ai() | Ac() | Ap() | Ad() | As() |
| B | Bi() | Bc() | Bp() | Bd() | Bs() |
| C | Ci() | Cc() | Cp() | Cd() | Cs() |

| | 2001 | 2002 | 2003 | 2004 | 2005 | 2006 | 2007 |
|---|---|---|---|---|---|---|---|
| | DEVICE NUMBER | DEVICE IDENTIFIER | EMPTY CAPACITY | EMPTY AREA INFORMATION | LU INFORMATION | PORT WWN | IP ADDRESS |
| | 1 | A | 200GB | | | WWN1, WWN2, WWN3, WWN4 | 192,168,1,3 192,168,1,4 |
| | 2 | B | 70GB | | | WWN5, WWN6 | 192,168,1,5 |
| | 3 | — | | | | | |

| DRIVE NUMBER | AREA-STARTING LBA | AREA-ENDING LBA |
|---|---|---|
| 1 | 0 | 255 |
| 1 | 1024 | 2047 |
| 2 | 0 | 65535 |
| | | |

FIG.5

| LU NUMBER 4001 | CAPACITY 4002 | PORT WWN 4003 | HOST LUN 4004 | RAID LEVEL 4005 | AREA INFORMATION 4006 | ALLOCATION-HOST WWN 4007 | EMPTY CAPACITY 4008 | EMPTY AREA INFORMATION 4009 |
|---|---|---|---|---|---|---|---|---|
| 0 | 1024MB | WWN1 | 0 | 5 | | WWNa | 960MB | |
| 1 | 1024MB | WWN2 | 1 | 5 | | WWNa | 960MB | |
| 2 | 128GB | WWN2 | 0 | 5 | | WWNb | 128GB | |

| VIRTUAL VOLUME NUMBER | DEVICE NUMBER | LU NUMBER | STARTING LBA | ENDING LBA |
|---|---|---|---|---|
| 1 | 0 | 0 | 0 | 131071 |
| 1 | 0 | 1 | 0 | 131071 |
| 1 | 1 | 0 | 0 | 131071 |
| 2 | 1 | 1 | 0 | 1048575 |

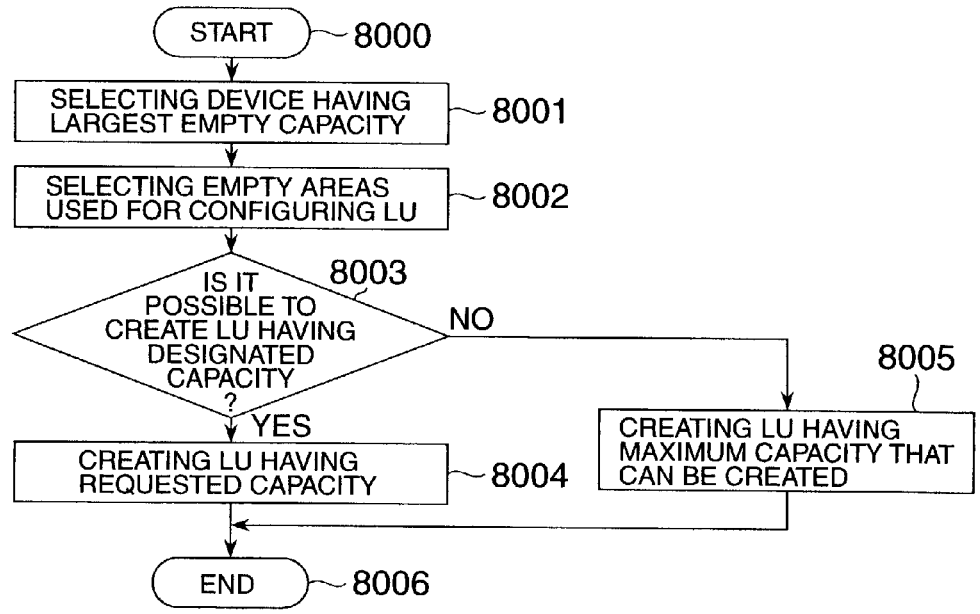
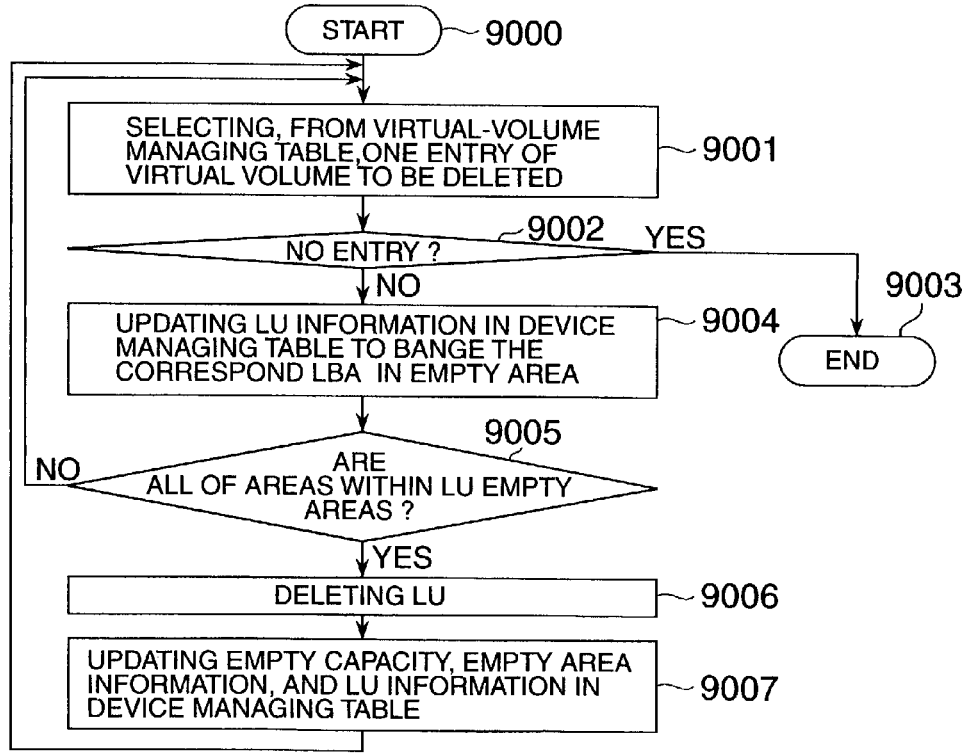

COMPUTER SYSTEM FOR MANAGING STORAGE AREAS IN A PLURALITY OF STORAGE DEVICES

BACKGROUND OF THE INVENTION

Field of the Invention

The present invention relates to a computer system including storage devices, host computers, and a managing server that are connected to via a network.

In recent years, in a computer system, a form referred to as "Storage Area Network (: SAN)", of which computers and storage devices are connected via a network such as a Fiber Channel, has been coming into a general use instead of a form referred to as "Direct Attached Storage (: DAS)" of which storage devices are directly connected to computers.

In the SAN, the large-capacity storage devices connected to the network can be shared among the plurality of computers connected to the same network. Also, in the SAN, the storage capacity and the performance of each storage device connected to the network are gradually increased in correspondence with an increase in the data amount. This makes it possible to reduce the introduction cost of each storage device.

In accompaniment with a prevalence of the SAN, it becomes a general practice to manage storage areas in the storage devices connected to the SAN in the block, and allocate the storage areas to the computers connected to the SAN according to requests.

Here, JP-A-2001-142648 has disclosed a technology that logical units (: LUs), which are storage areas defined in advance within the respective storage devices, and newly created LUs are managed in a one-dimensional manner by a management-specific computer (hereinafter, referred to as "a managing server"), and then, the LUs are allocated to the computers in response to the requests therefrom.

SUMMARY OF THE INVENTION

In the prior art, the storage areas of multiple storage devices connected to the SAN are managed as one storage area group (hereinafter, referred to as "a storage pool"). In the prior art, however, it is assumed that the storage devices connected to the SAN are controlled by one and the same method. Accordingly, in the prior art, when a plurality of storage devices of which control methods differ each other are connected to the SAN, it is impossible to integrate storage areas in a storage device of which control method differs from the assumed control method into the storage pool and manage them.

Also, in the prior art, only a managing tool belong to each storage device can delete the LUs once created within each storage device. Consequently, for users, it is difficult to modify LU configurations within the storage devices, and to modify the LU configurations in the storage pool in response to requests from the computers and a variation of an usage situation.

An object of the present invention is to provide a computer system for managing, in charge, storage areas in a plurality of storage devices of which control methods differ each other, and to allocate the storage areas to the computers as needed.

According to the present invention, a managing server connected to a network manages intensively the storage areas provided by each storage device connected to the network. The managing server includes a device control library that stores control programs for controlling various storage devices, and a device information database that parallelizes identifiers allocated to each storage devices and the control programs for controlling the storage devices, respectively. Using these information, the managing server manages a plurality of storage devices having different control methods.

Also, as a preferable aspect of the present invention, it is possible to consider a constitution that when a computer using a storage device (hereinafter, referred to as "host computer") releases an unnecessary storage area, the managing server controls the storage device to delete a logical storage area in the storage device, having become not used by any host computers, and then, manages the deleted logical storage area as an unused area. Moreover, when newly allocating a storage area to the host computer, if there is no appropriate existing LU, the managing server creates another LU correspond to a requested condition newly from the unused area.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram for illustrating the configuration of a device information database;

FIG. 3 is a diagram for illustrating the configuration of a device managing table;

FIG. 4 is a diagram for illustrating the configuration of empty area information in the device managing table;

FIG. 5 is a diagram for illustrating the configuration of LU information in the device managing table;

FIG. 6 is a diagram for illustrating the configuration of a virtual-volume managing table;

FIG. 9 is a flowchart for a LU creation; and

FIG. 10 is a flowchart for a virtual volume deletion.

DESCRIPTION OF THE EMBODIMENTS

The present embodiment is as follows: Storage areas provided by a plurality of storage devices, concretely, a plurality of disk array systems, are managed in a one-dimensional manner by a managing server, and allocated, as virtual volumes, to a plurality of host computers connected via a Fiber Channel network. In this embodiment, a SCSI protocol via the Fiber Channel is used to access from the host computers to the storage areas.

In addition, in the embodiment hereinafter, each storage device is explained as a disk array system, i.e., a storage device that includes a plurality of disk devices and a control unit for controlling the disk devices. However, each storage device is not limited thereto, and may be a simple disk device as a single body or a cluster of it.

Figure 1:
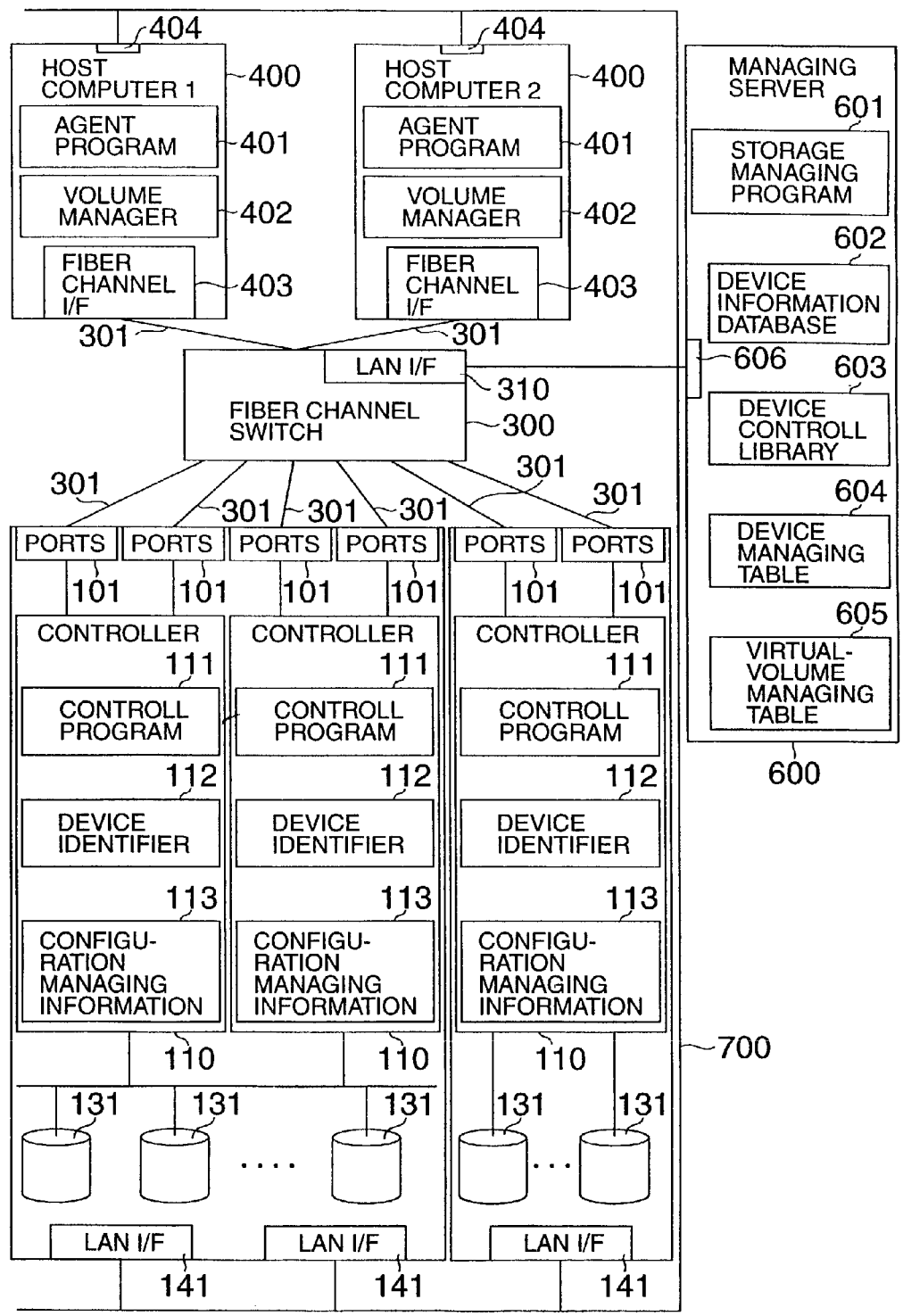
FIG. 1 is a diagram for illustrating the entire configuration of an embodiment according to the present invention.

FIG. 1 is a diagram for illustrating the configuration of a 1st embodiment of a computer system applied by the present invention. Hereinafter, although not particularly illustrated, each computer includes a processor and a memory. In addition, a program of each computer is stored in the memory and executed by the processor.

The computer system in the present embodiment has a configuration that 2 host computers 400 and 2 disk array systems 100 and 200 are connected to each other via a Fiber Channel switch 300 and Fiber Channel cables 301. Also, the host computers 400, the disk array systems 100 and 200, and a managing server 600 are connected to each other via a Local Area Network (: LAN) 700.

The disk array system 100 includes controllers 110, a plurality of Fiber Channel ("FC") ports 101, local-area-network interfaces, and a plurality of disk drives 131.

The controller 110 includes a control program 111, a device identifier 112, and configuration managing information 113 in a memory of the controller 110. The controller 110 executes the control program 111 by a processor (a CPU) of the controller itself, thereby controlling the disk array system 100. Also, the controller 110 provide the host computers 400 with logical units (: LUs) configured by storage areas in the disk drives 131. In addition, the LUs may be configured within one disk drive 131, or may be configured over a plurality of disk drives 131. Also, each controller 110 is duplexed in preparation for an occurrence of a failure.

Each LU is provided with a LU number (: LUN) corresponding to one or more FC ports 101. Also, each FC port 101 is provided with a World Wide Name (: WWN), that is an identifier unique all over the world. The host computers 400 specifies a LU to become an access destination, by designating a WWN and a LUN. Also, the controllers 110 have a function of using a WWN and a LUN so as to limit host computers 400 that can access each LU (hereinafter, referred to as "LUN security").

In a configuration managing information 113, an information indicating a correspondence relationship between LUs and storage areas in the disk drives 131, and an information indicating a correspondence relationship between LUs and LUNs. Also, the disk array system 100 includes a device identifier 112 specific to a type (model) of each device. When the controller 110 in the disk array system 100 is duplexed, one and the same device identifier 112 is attached to each controller 110.

The controller 110, by executing the control program 111, informs the managing server 600 of the device identifier 112, using a common protocol for the devices connected to the network, such as Simple Network Management Protocol (: SNMP). The device identifier 112 is provided as, e.g., a system object of the standard Management Information Base (: MIB) designated by an object ID 1. 3. 6. 1. 2. 1. 1. The details of the SNMP and the MIB are explained in the RFC 1157 and the RFC 1213.

As the disk array system 100 and the disk array system 200 are different only in whether or not each controller 110 has been duplexed, an explanation of the disk array system 200 will be omitted. Hereinafter, the disk array systems 100 and 200 as a whole will be referred to as "disk array systems 100".

The host computer 400 includes an agent program 401 and a volume manager 402 in a memory of its own, and includes a Fiber Channel interface 403 and a local-area-network interface 404. The host computer 400 is connected to the disk array systems 100 and the like via the FC interface 403. The host computer 400 performs, via the FC interface 403, an input/output of data into/from the LUs provided by the disk array systems 100.

The host computer 400, by executing a volume manager 402 by the processor of its own, configures a logically-single virtual volume with one or more LUs provided by the disk array systems 100, and then provides a user of the host computer 400 with it.

By an application program executed in the host computer 400, the virtual volume is recognized as a single storage area (i.e., a disk volume). Furthermore, the host computer 400 configures a file system on the virtual volume.

The host computer 400, by executing an agent program 401 by the processor, communicates with the managing server 600 via a LAN 700. The agent program 401 executed in the host computer 400, in accordance with an instruction of the managing server 600, controls an operating system (: OS) executed in the host computer 400. Concretely, the agent program 401, by controlling the OS, causes the OS to recognize the LUs provided by the disk array systems 100. Also, the host computer 400, by executing the agent program 401 to control the volume manager 402, provides instructions for creating, expanding, and deleting the virtual volume.

The managing server 600 includes, in a memory of its own, a storage managing program 601, a device information database 602, a device control library 603, a device managing table 604, and a virtual-volume managing table 605. Also, the managing server 600 has a local-area-network interface 606.

The managing server 600, by executing the storage managing program 601 by a processor, communicates with the disk array systems 100 and the host computers 400 via the local-area-network interface 606. Application program interfaces (: APIs) by which the managing server 600 controls various disk array systems 100 are registered in the device controlling library 603. The device control library 603 is implemented as, e.g., a function library, which is dynamically linked with the storage managing program 601 by the OS of the managing server 600 at the time of executing the storage managing program 601, and a definition of data structure passed at a function calling.

In the device information database 602, informations, which defines an API to be used among the APIs stored in the device control library 603 with respect to various disk array systems 100, are stored.

FIG. 2 is a diagram for illustrating a configuration of the device information database 602. The device identifier 112 specific to a type of the disk array system 100 is recorded into a device identifier entry 1001. An information indicating the APIs for controlling the disk array system 100 is recorded into entries 1002 to 1006. Concretely, APIs, which perform an acquisition of each configuration managing information 113 of each disk array system 100, a creation of Lus, an allocation of LUs to FC ports 101 and a definition of LUNs, a deletion of LUs, and a set-up of LUN securities, is set up in the respective entries.

A manager of the managing server 600 installs in the managing server 600 from an external record medium such as a CD-ROM, an information on a disk array system 100 to be supported, a definition file that lists up the APIs (i.e., the function names) for controlling the disk array system 100, and a dynamic library (i.e., a library capable of being dynamically linked) for providing actual functions.

A device managing table 604 records a configuration managing information 113 owned by all of the disk array systems 100 which the managing server 600 manages.

FIG. 3 is a diagram for illustrating a configuration of the device managing table 604. A specific device number allocated to a disk array system 100 of a managed target is registered in an entry 2001. The device number is a value for uniquely identifying the disk array systems 100, and are allocated thereto not to be overlapped.

A device identifier 112 allocated to the disk array system 100 is stored into an entry 2002. An information indicating a capacity of an empty storage area not used as LUs is stored into an entry 2003.

An information indicating a configuration of the empty storage area of the disk array system 100 is registered into an entry 2004.

FIG. 4 is a diagram for illustrating a concrete configuration of the entry 2004.

An information that indicates starting and ending Logical Block Addresses (: LBAs) of the empty storage area are registered into the entry 2004, per each disk drive of the disk array system 100. Concretely, the numbers indicating the respective disk drives are registered in an entry 3001. The starting LBAS of the empty storage areas are registered into an entry 3002. The ending LBAS of the empty storage areas are registered into an entry 3003. When a plurality of empty storage areas are in one disk drive, entries that are equivalent to the number of the empty storage areas are created.

Here, going back to the explanation in FIG. 3, an information on the LUs that each disk array system 100 provides is registered into an entry 2005.

FIG. 5 is a diagram for illustrating the concrete configuration of the entry 2005. Non-overlapped serial numbers distributed to the LUs within the disk array system 100 are registered into a LU number entry 4001. These numbers make it possible to uniquely specify the LUs within the disk array system 100.

An information indicating a storage capacity of each LU is registered into a capacity entry 4002. A WWN attached to a port 101 included in an access path to a corresponding LU (hereinafter, referred to as "an access path") and a LUN allocated to the LU corresponding to the port 101 are registered into a port WWN entry 4003 and a host LUN entry 4004, respectively. An information for a redundancy configuration of the LUs is registered into a RAID level entry 4005. In the present embodiment, an information indicating RAID 1 or RAID 5 is registered therein.

The RAID level 1 is a redundancy configuration to store one and the same data into two storage areas. The RAID level 5 is a redundancy configuration where, into storage areas of one disk drive out of a plurality of disk drives 131, parities of data recorded into the other disk drives are recorded. In addition, in the present invention, an embodiment is possible where a RAID level other than the RAID 1 or the RAID 5 is employed. The details of the RAID level have been described in, e.g., a thesis by Patterson et al. "A Case for Redundant Array of Inexpensive Disks (RAID)", ACM SIGMOD Conf., June 1988.

The information on the storage areas that configure the LUs is registered into an area information entry 4006. The concrete configuration of the entry 4006 is basically the same as that of the entry 2004. The WWN, to which the FC interface 403 of the host computer 400 allocated the LU is attached, is registered into an allocation-host WWN entry 4007.

A capacity of the empty area not used for a configuration of a virtual volume, of the storage capacity of the LU indicated in the entry 4002, is registered into an empty capacity entry 4008. A range of the LBA that configures the empty area of the LU is registered into an empty-area information entry 4009. A concrete configuration of the entry 4009 is a configuration that, of the entries illustrated in FIG. 4, has the entries 3002 and 3003.

Here, going back to the explanation in FIG. 3, the WWN, attached to the respective FC ports 101 that the disk array system 100 includes, is registered into a port WWN entry 2006. IP addresses attached to the respective LAN interfaces of the device are registered into an IP address entry 2007.

FIG. 6 is a diagram for illustrating a concrete configuration of the virtual-volume managing table 605. An information, indicating a correspondence relationship between the virtual volumes provided for users and the LUs of the disk array system 100, is registered into the virtual-volume managing table 605.

The virtual-volume managing table 605 has one entry with respect to one of the storage areas within the LUs that configure a virtual volume. Non-overlapped serial numbers distributed to the respective virtual volumes are registered into a virtual volume number entry 5001. The virtual volume numbers are used for uniquely specifying the virtual volumes.

A device number of a disk array system 100 providing a LU that configures a corresponding virtual volume is registered into a device number entry 5002. A LU number of a LU that configures the virtual volume, and a starting LBA and a ending LBA of the storage area within the LU used for configuring the virtual volume are registered into a LU number entry 5003, a starting LBA entry 5004 and an ending LBA entry 5005, respectively.

In the present embodiment, in order that the managing server 600 executes the storage managing program 601 to manage intensively the storage areas provided by the disk array system 100, at first, the disk array system 100 that becomes a management target must be registered into the device managing table 604. This process is performed especially when a new disk array system 100 is added to the network.

Figure 7:
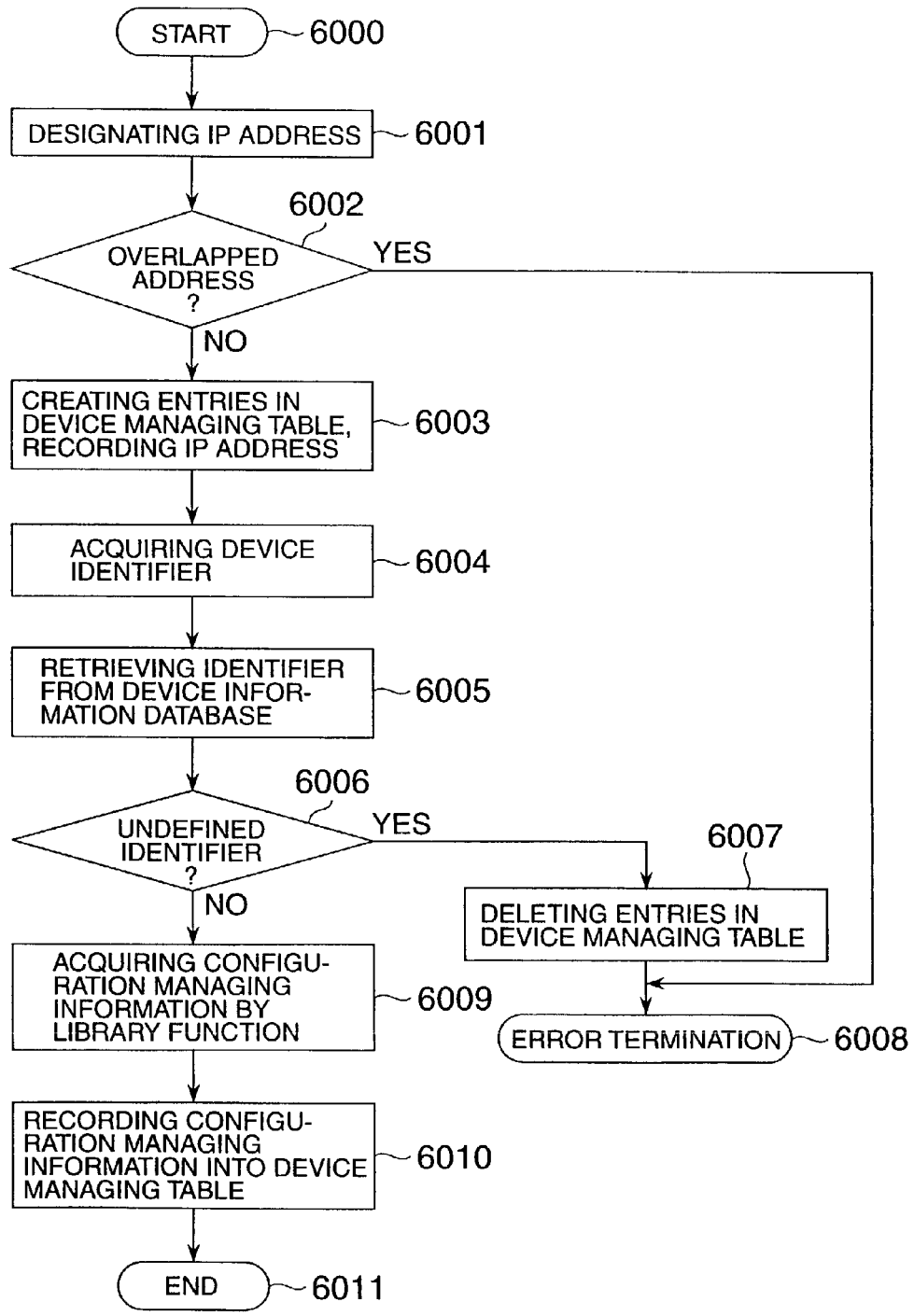
FIG. 7 is a flowchart for the registration into the device managing table.

FIG. 7 is a flowchart for illustrating the processing steps at which the managing server 600 registers the disk array system 100 into the device managing table 604. These steps, actually, are executed by being executed the storage managing program 601 in the managing server 600.

At first, the manager designates an IP address of a disk array system 100 to be registered. Concretely, the manager inputs, into the managing server 600, the IP address of the disk array system 100 to be registered. In addition, the IP address may be directly inputted into the managing server 600 by a keyboard or the like, or the information inputted by another computer or the like via a network may be transferred to the managing server 600 (step 6001). The managing server 600 checks whether or not the designated IP address is overlapped with an IP address registered in the device managing table 604 (step 6002).

If the IP addresses overlap, the managing server 600 reports an error to the user, then terminates the registration process (step 6008). If not overlap, the managing server 600 creates new entries in the device managing table 604, then records the device number and the designated IP address not overlapping with already-existing ones (step 6003).

Next, using the SNMP protocol and via the local-area-network interface 606, the managing server 600 communicates with the disk array system 100 of the designated IP address, and acquires the device identifier 112 distributed to the disk array system 100. After that, the managing server 600 records the acquired device identifier 112 into a corresponding entry in the device managing table 604.

In the present embodiment, the device identifier is provided on the basis of the standard MIB of the SNMP. Consequently, if the disk array system 100 includes a SNMP agent function, the managing server 600 can acquire the device identifier 112 from the disk array system 100 by a common processing in compliance with the SNMP, independently of the type of the disk array system 100 (step 6004).

The managing server 600 retrieves the acquired device identifier 112 in a device information database 602 (step 6005), and checks whether or not this device identifier 112 has been defined, i.e., has been registered in the device information database 602 (step 6006). If the device identifier 112 has been not registered therein, the managing server 600 cannot control the disk array system 100 that has the device identifier 112. On account of this, the managing server 600 deletes the entries created in the device managing table 604 at the earlier step (step 6007), then reports an error to the manager and terminates the process (step 6008).

If the device identifier 112 has been registered in the device information database 602, the managing server 600 retrieves, from the device information database 602, an API of an information acquiring function corresponding to the device identifier 112. After that, the managing server 600 calls, from the device controlling library 603, and executes the retrieved API of the information acquiring function, and then acquires the configuration managing information 113 of the disk array system 100 of the registration target.

Concretely, the managing server 600 executes the called API, to instruct, via the LAN 700, the disk array system 100 to provide the configuration managing information 113. Having received the instruction, the disk array system 100 transmits the requested information to the managing server 600. The communications between the disk array system 100 and the managing server 600 are performed by a particular command stipulated by the vendor of these devices. This processing content is basically identical to the operations (i.e., the LU creation, the LU deletion, the path creation, and the LUN security set-up) other than the acquisition of the configuration managing information (step 6009).

The managing server 600 records, into the device managing table 604, an information on the configuration of all the LUs of the disk array system 100, an access paths, and a configuration of the empty areas, all of which are included in the configuration managing information 113 acquired from the disk array system 100.

The managing server 600, by referring to the acquired configuration managing information 113, acquires, of the information in the respective entries in the device managing table 604, informations on items other than the allocation-host WWN entry 4007, the empty capacity entry 4008, and the empty area information entry 4009.

Incidentally, since no LU is allocated to the host computers 400 at the registration point-in-time of the disk array system 100, "nothing" is registered into the allocation-host WWN entry 4007.

Also, since all the storage capacities of the disk array system 100 are unused at first, the values that are the same as those in the capacity entry 4002 are registered into the empty capacity entry 4008. Also, from the same reason, the starting LBA and the ending LBA of each LU are registered into the empty-area information entry 4009 of each LU (step 6010).

The above-described processing allows the managing server 600 to register the new disk array system 100 into the device managing table 604.

Incidentally, in the present embodiment, the managing server 600, at the step 6004, has acquired the device identifier 112 from the disk array system 100 by using the SNMP protocol. However, when a disk array system 100 not included any SNMP agent function is added to the device managing table 604, the manager may designate, by a hand operation, the device identifier 112 toward the managing server 600 together with the IP address.

Figure 8:
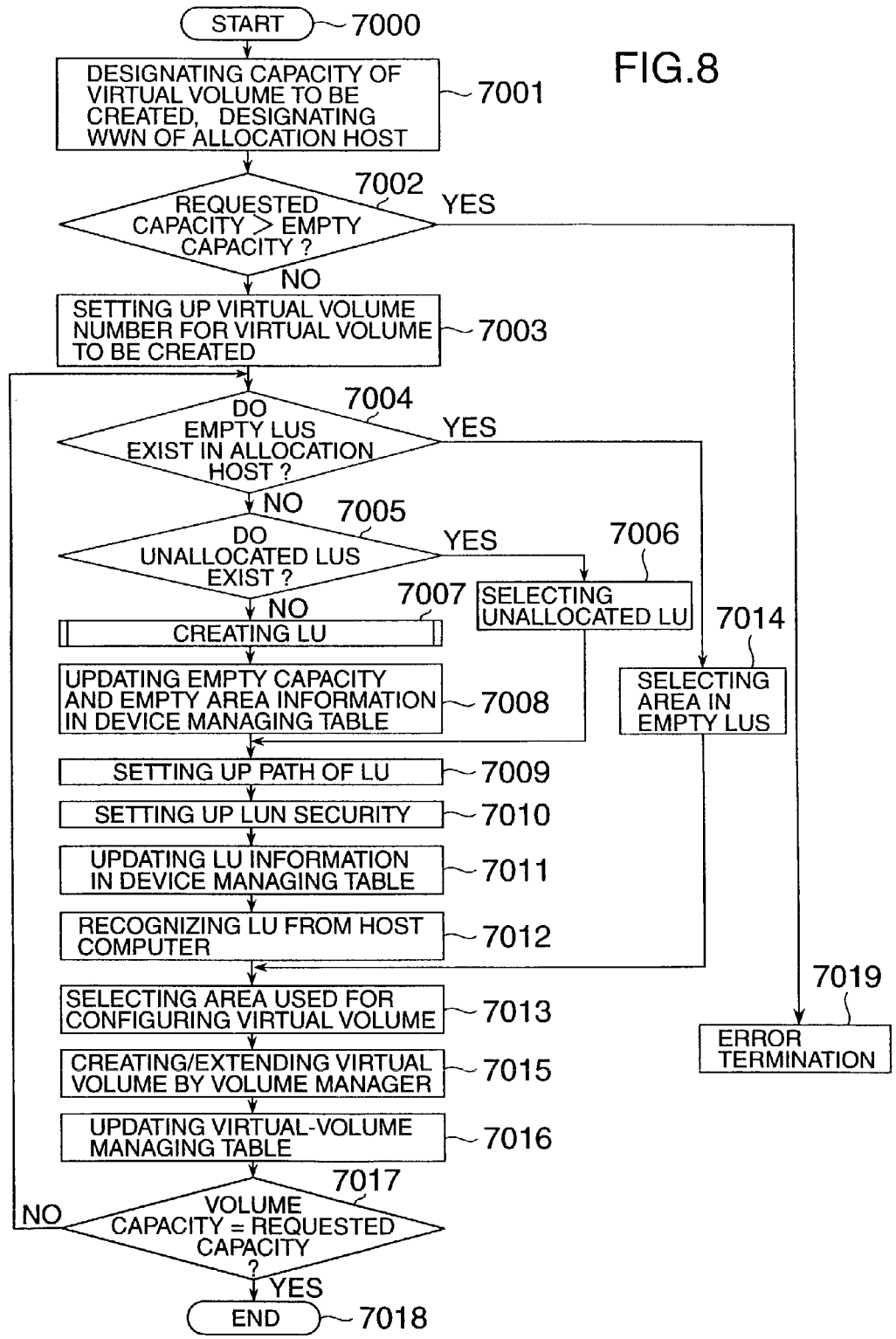
FIG. 8 is a flowchart for a virtual volume creation.

FIG. 8 is a diagram for illustrating a flow of a creation processing of a virtual volume and of an allocation processing of the created virtual volume to the host computer 400 in the present embodiment. Basically, the following processing steps are executed in the manner where the storage managing program 601 is executed in the managing server 600.

At first, the manager of the computer system inputs, into the managing server 600, the storage capacity of a virtual volume to be created and the WWN of the FC interface 403 of a host computer 400 to which the virtual volume to be created are input. The manager of the present computer system inputs, by a hand operation, these values into the storage managing program 601 in the managing server 600. Otherwise, the user may designate the values, which are, concretely, the WWN of the host computer 400 and the like, toward the managing server 600, using the agent program 401 that runs on the host computer 400 becoming the allocation destination and via the LAN 700 (step 7001).

The managing server 600, by referring to the device managing table 604, checks whether or not the requested storage capacity can be provided for the host computer 400. The maximum value of the storage capacity that can be provided for a certain host computer 400 is a summation of a total capacity of a empty capacity of each disk array system 100, and the capacity of unused areas within LUs allocated to the host computer 400 that requests the allocation of the virtual volume.

Here, the unused areas within LUs means areas that are allocated to the host computer 400, but are not allocated to the virtual volume. Whether or not a certain LU is allocated to the host computer 400 can be judged by comparing the WWN registered in the allocation-host WWN entry in FIG. 5 and the WWN of the FC interface 403 of the allocation destination host computer 400 included in a request of virtual volume. Concretely, if the compared WWNs coincide with each other, it can be judged that the LU is allocated to the host computer 400. After that, the managing server 600, by retrieving the empty capacity entry 4008, acquires a storage capacity of unused areas within the LUs allocated to the host computer 400 (step 7002).

When the requested storage capacity is larger than the above-described maximum value, the managing server 600 transmits an error to the host computer 400, then terminates the processing (step 7019).

When the requested storage capacity is smaller than the above-described maximum value, the managing server 600 judges that the storage capacity requested from the host computer 400 can be provided to the host computer 400. As a result, the managing server 600 determines, for a new virtual volume to be created, a virtual volume number that does not overlap with already-existing virtual volume numbers (step 7003).

After having determined the virtual volume number, the managing server 600 selects storage areas and storage capacities that configure a virtual volume corresponding to the virtual volume number determined. This means that, basically, the managing server 600 performs the following processing: Namely, selecting storage areas that can be allocated to the virtual volume, thereby creating a virtual volume. Then, if the storage capacity of the created virtual volume does not attain to the requested storage capacity, the server 600 repeats a processing of further selecting another storage area and adding it to the virtual volume, and then, finally, creates a virtual volume of the requested storage capacity.

Hereinafter, the explanation will be given below concerning the concrete steps of the processing.

The managing server 600 confirms whether or not, of the LUs already allocated to the host computer 400, there exist LUs that have unused areas (step 7004). If there exist LUs that have unused areas, the managing server 600 selects one of the unused areas (step 7014), then executes a process corresponding to the step 7013.

When there exists none of the LUs that have the unused areas, the managing server 600 retrieves from the device managing table 604 so as to confirm whether or not there exist LUs that have been not allocated to the host computer 400 (hereinafter, referred to as "unallocated LUs"). Concretely, the unallocated LUs are LUs about which the allocation-host WWN entry 4007 of the LU information in the device managing table 604 contains "nothing" (step 7005). If there exist the unallocated LUs, the managing server 600 selects one of the unallocated LUs (step 7006), then executing a processing that corresponds to a step 7009.

If there exists none of the unallocated LUs, the managing server 600 newly creates a LU in the disk array system 100 (step 7007).

FIG. 9 is a flowchart for illustrating a flow of the LU creation process performed by the managing server 600 and the disk array system 100. Using the present diagram, the explanation will be given below concerning the processing steps of the LU creation. Incidentally, this process is also performed by executing the storage managing program 601 by the managing server 600.

At first, the managing server 600 refers to the empty capacity entry 2003 for each disk array system 100 registered in the device managing table 604, to select a disk array system 100 having the largest empty capacity. This, in the present embodiment, makes it possible to equalize storage capacities used in each disk array systems 100.

As other forms of selecting the disk array system 100, it is possible to use a round-robin for selecting the disk array system 100, or the manager selects a particular disk array system 100 (step 8001).

Next, the managing server 600 selects empty areas being used for configuring LU to be created. Concretely, based on the empty area information (FIG. 4) in the device managing table 604, the empty areas are selected in harmony with the specifications of the LU creating function in the disk array system 100, which the LU creating API provided by the device controlling library 603 provides owns.

For example, when by using the API registered in the device controlling library 603, the managing server 600 can instruct the disk array system 100 having empty areas to configure a LU of RAID level 1, the managing server 600 selects two empty areas of the same size from a set of the empty areas of the disk array system 100.

Also, when by using the API registered in the device controlling library 603, the managing server 600 can instruct the disk array system 100 having empty areas to configure a LU of RAID level 5, the managing server 600 selects three or more empty areas of the same size from a set of the empty areas of the disk array system 100. When the two are possible, by defining previously one RAID level, e.g., the RAID level 5, as a higher-priority level, only when a LU cannot be configured by RAID level 5 (i.e., there exist only two empty areas), empty areas are selected such that the LU is configured by RAID level 1 (step 8002).

Next, the managing server 600 judges whether or not the storage capacity of the LU that can be configured by the selected empty areas is larger than the requested storage capacity (step 8003). If the storage capacity is larger than the requested storage capacity, the managing server 600 creates the LU having the requested storage capacity (step 8004).

If the configurable storage capacity is smaller than the requested storage capacity, the managing server 600 creates the LU having the maximum storage capacity configurable.

Concretely, a creation of the LU is implemented as that, by using the device identifier 112 of the disk array system 100 recorded in the device managing table 604, the managing server 600 retrieves the LU creating API from the device information database 602, calls the API provided by the device controlling library 603, and executes it. At the time of calling the API, the managing server 600 designates, as parameters, the areas and the RAID level to be used, for example (step 8005).

Meanwhile, at the time of the execution of the API, the information on the configured LU is transmitted to the disk array system 100. The disk array system 100, which has received the information on the configured LU, executes the controlling program 111 so as to update the configuration managing information 113. Concretely, the disk array system 100 adds, to the configuration managing information 113, a correspondence between the created LU and the actual storage areas of the disk drives.

Here, to the explanation of the process in FIG. 7.

After having created the LU, the managing server 600 updates the device managing table 604. Concretely, the managing server 600 registers, into the device managing table 604, the storage area corresponding to the created LU. Also, the managing server 600, from the empty capacity of the disk array system 100 from which the LU is created, subtracts the capacity of a memory area used for creating the LU, and then deletes an information on these areas from the empty area information (step 7008).

Next, the managing server 600 allocates a port and sets up a host LUN with respect to the created LU or the LU selected at the step 7006, and then sets up an access path from the host computer 400. As is the creation of the LU, this process is performed by the managing server 600 executing the corresponding API provided by the device controlling library 603.

Meanwhile, when the corresponding API is executed, the port allocation information and the like are transmitted to the disk array system 100. The disk array system 100, which has received the port allocation information and the like, executes a controlling program 111 to update a configuration managing information 113. Concretely, the disk array system 100 adds, to the configuration managing information 113, a correspondence between the created LU and the LUN and the port to be allocated to this LU.

Also, the managing server 600 sets up a LUN security with respect to the created LU. Concretely, in order to designate the host computer 400 that will be permitted to access the created LU, the managing server 600 sets up the WWN of the FC interface 403 of the host computer 400, which had been designated at the step 7001, in a state of being made to correspond to the created LU (steps 7009 and 7010).

The managing server 600 registers the above-described LU-related information, i.e., the access path information and the LUN security information, into the device managing table 604. Incidentally, the created LU registered at this point is not yet used as storage areas that configure the virtual volume, so that in the LU information in FIG. 5, the same value as the LU capacity entry 4002 is registered into the empty capacity entry 4007, and the starting LBA and the ending LBA of this LU are registered into the empty-area information entry 4009. At this point, the created LU gets into a recognizable state from the host computer 400 (step 7011).

The managing server 600 communicates with the agent program 401 executed on the host computer 400, and instructs the host computer 400 to recognize the created LU. The host computer 400 received the instruction, by executing the agent program 401, calls an API command or the like provided by the OS generally, to scan LUs that are recognizable on the FC network, then creates device files as accessible from the volume manager 402, for example. This process is basically the same as the process as an additional disk drive is added on the host computer 400 (step 7012).

Next, the host computer 400, by executing a volume manager 402, creates the virtual volume in cooperation with the managing server 600. Concretely, the managing server 600, which has created the LU and the like, refers to the empty-area information entry 4009 about the LU obtained at the step 7007 or the step 7014, and selects a storage area within the LU to be used for creating the virtual volume. Next, the managing server 600 transmits the parameters (e.g., the port WWN, the LUN, and the starting LBA and the ending LBA of the storage area to be used) of the selected storage area to the host computer 400 via the LAN 700.

Incidentally, as to a process for extending an existing virtual volume, the managing server 600 also transmits informations on LUs included in the target virtual volume to extend. This is intended that the host computer 400 recognizes the target virtual volume to extend.

The host computer 400, received the information on the storage area within the LU to be used for creating the virtual volume via the local-area-network interface 404, by executing the agent program 401, creates a virtual volume, using the storage area within the LU indicated by the transmitted parameters.

In case that the storage capacity of the empty area is larger than the storage capacity requested by the user, the managing server 600 creates or extends the virtual volume as much as the requested capacity. Also, in case that the storage capacity of the empty area is smaller than the storage capacity requested by the user, the server 600 creates or extends the virtual volume as much as the capacity of the empty area. Incidentally, in the case of creating the virtual volume, the process steps are executed from the step 7000. However, when it does not achieve an amount of storage capacity requested by the user at one process, the process steps from the step 7004 are repeated so as to create a virtual volume of a necessary storage capacity as will be described later (step 7015).

After that, the host computer 400 and the managing server 600 reflect the area used to create or extend the virtual volume onto the virtual-volume managing table 605. Concretely, the host computer 400 transmits the information on the LU allocated to the virtual volume to the managing server 600 via the LAN 700. The managing server 600, received the information on the LU allocated to the virtual volume, records the virtual volume number, the device number, the LU number, and the starting and ending LBAs that correspond to the allocated LU into the virtual-volume managing table 605 (step 7016).

At this point, the managing server 600 compares between the storage capacity of the created virtual volume and the storage capacity requested from the user (step 7017). If the storage capacity of the created virtual volume has attained to the storage capacity requested from the user, the server 600 terminates the processing (step 7018). If the storage capacity of the created virtual volume does not attain to the requested storage capacity, the server 600 goes back to the step 7004 with the shortfull as a new requested capacity, then repeating the process steps from the step 7004 to the step 7015 until the virtual volume of the requested capacity is created.

By the above-described processing steps, the computer system of the present invention can create the virtual volume of the storage capacity requested by the user, and then allocate the created virtual volume to the host computer 400 within the computer system. Also, the computer system of the present invention can extend the storage capacity of an existing virtual volume by using basically the same process as the creation of the virtual volume. In this case, a creation of a new virtual volume in the host computer 400 which is necessary to create a virtual volume, and a recording of an existing virtual volume numbers as updating of the virtual-volume managing table 605 are not needed.

Next, the explanation for deleting the virtual volume in the computer system of the present invention will be given below. When deleting a virtual volume, at first, the host computer 400 executes the volume manager 402 so as to delete the virtual volume, for example, deletes a device file corresponding to the virtual volume so as to make the virtual volume inaccessible from an application program. After that, the host computer 400 transmits the information on the deleted virtual volume to the managing server 600 via the LAN 700.

The managing server 600 received the information on the deleted virtual volume, executes the storage managing program 601, to update the information on the area management. Concretely, the managing server 600 deletes the information on the virtual volume registered in the virtual-volume managing table 605.

FIG. 10 is a flowchart for illustrating the process steps performed by the managing server 600 when the virtual volume is deleted. Incidentally, the following process steps are executed by the managing server 600 performing the storage managing program 601.

Using the information received from the host computer 400, the managing server 600 selects the virtual volume number of a virtual volume to be deleted (step 9001), from the virtual-volume managing table 605. If the virtual volume to be deleted is not found out (step 9002), the server 600 terminates the delete process (step 9003).

When selecting the virtual volume number of the virtual volume to be deleted, the server 600 modifies the LU information in the device managing table 604 to change the entry area corresponding to the selected virtual volume number to an unused area (step 9004). Concretely, this process is performed by joining the storage area within the LU allocated to the virtual volume to the empty area information entry 4009, and adding the storage capacity of the storage area within the LU to the empty capacity entry 4008.

Next, the managing server 600 checks whether or not, with that the storage area within the LU allocated to the virtual volume has been changed to a unused area, the full LU has been changed to unused areas (step 9005). If the full LU has been not changed to unused areas, the managing server 600 goes back to the process step 9001. If all the storage areas within the LU have been changed to unused areas, the managing server 600 deletes the LU all the storage areas of which have been converted into the unused areas, from the disk array system 100.

Concretely, as is the creation of the LU, the creation of the access path, and the set-up of the LUN security, this process is performed by the managing server 600 calling and executing the API provided by the device controlling library 603.

After deleted the LU, the managing server 600 updates the empty capacity entry 2003, the empty area information entry 2004, and the LU information entry 2005 in the device managing table 604. The storage capacity of the storage areas having configured the deleted LU is added to the empty capacity entry 2003. The information on the storage areas having configured the deleted LU is joined to the empty area information entry 2004. The entry of the deleted LU is deleted from the LU information entry 2005 (Step 9006).

By the API executed by the managing server 600, the disk array system 100 receives the information on the deleted LU. The disk array system 100 received the above-mentioned information, executes the control program 111, to update the configuration managing information 113. Concretely, the disk array system 100 deletes the correspondence information with the storage areas concerning the deleted LU, and the LUN allocation information, from the configuration managing information 113.

The above-described processing steps, the computer system of the present invention performes the deletion of the virtual volume and the deletion of the LU that has configured the deleted virtual volume.

Incidentally, although, in the present embodiment, the virtual volume has been allocated to each host computer 400, it is also possible that each host computer 400 further provides the virtual volume, which has been allocated to each host computer 400, for another computer via a network. Also, although, in the present embodiment, the managing server 600 and the host computers 400 have been explained in a manner of being separated to each other, it is also possible to co-use one of the host computers 400 and the managing server 600.

According to the present invention, even in the case where the plurality of storage devices are respectively controlled by the controlling methods that differ from each other, the controlling APIs prepared on each storage-device basis are used depending on the cases. This condition makes it possible to manage, in the one-dimensional manner, the storage areas that the respective storage devices provide.

Also, an unnecessary LU is deleted within a storage device so as to be managed as an unused area. This condition, when newly allocating an area to a host computer, makes it possible to newly create, from the unused area, a LU that meets a requested condition. This, eventually, allows the implementation of the flexible area allocation.

The present invention permits the implementation of the system configuration that is completely independent of the types of the respective storage devices.

Also, when newly allocating a storage area to a host computer, even if there exists no appropriate LU in the already-existing LUs, the present invention makes it possible to allocate, to the host computer, a LU that meets a requested condition.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system, comprising:
a plurality of computers; and
a plurality of storage systems coupled to said plurality of computers via a first network used for data transfer,
wherein said plurality of computers include a management computer,
wherein said management computer includes:
a processor;
a memory in which a plurality of programs for controlling said plurality of storage systems are stored and in which a database including information indicating a relation between a type of storage system and a program of the plurality of programs to be used for controlling a storage system belonging to the type, and
an interface coupled to the plurality of storage systems and the plurality of computers via a local area network (LAN) which is different from the first network,
wherein said processor selects one of said plurality of storage systems based on information sent by a one of said plurality of computers to the management computer via the LAN, specifies a type of said selected storage system, selects one of said plurality of programs which corresponds to the selected storage system based on the specified type of storage system and the information indicating a relation between the specified type of storage system and the selected one of said plurality of programs, and executes the selected one of said plurality of programs to send an instruction to the selected storage system via the LAN,
wherein said selected storage system creates a logical storage area in accordance with the instruction sent from the management computer via the LAN, and
wherein the one of the plurality of computers accesses to the logical storage area via the first network.

2. A computer system according to claim 1, wherein said selected storage system includes:
a disk device;
a plurality of ports coupled to the plurality of computers via the first network; and
a controller,
wherein said controller creates the logical storage area and assigns the logical storage area to a one of the plurality of ports coupled to the one of the plurality of computers via the first network in accordance with the instruction.

3. A computer system according to claim 2, wherein said information includes capacity information of a virtual storage area,
wherein the management computer instructs said selected storage system to create the logical storage area which has a capacity in accordance with the capacity information by sending the instruction to the selected storage system via the LAN and sends information of said created logical storage area to said one of the plurality of computers via the LAN, and
wherein said one of the plurality of computers constructs the virtual storage area based on said information of said created logical storage area by using said logical storage area and uses said logical storage area as the virtual storage area via the first network.

4. A computer system according to claim 3, wherein the first network is a Fibre Channel (FC) network.

5. A computer system, comprising:
a plurality of computers; and
a plurality of storage systems coupled to said plurality of computers via a first network used for data transfer,
wherein said plurality of computers include a management computer,
wherein said management computer includes:

a processor, a memory in which a plurality of programs for controlling said plurality of storage systems are stored, and an interface coupled to the plurality of storage systems and the plurality of computers via a local area network (LAN) which is different from the first network, wherein said processor selects one of said plurality of storage systems based on information sent by a one of said plurality of computers to the management computer via the LAN, specifies a type of said selected storage system, selects a one of said plurality of programs which corresponds to the selected storage system based on the specified type of storage system, and executes the selected program to send an instruction to the selected storage system via the LAN, wherein said selected storage system creates a logical storage area in accordance with the instruction sent from the management computer via the LAN, and wherein the one of the plurality of computers accesses to the logical storage area via the first network, wherein said selected storage system includes:

a disk device, a plurality of ports coupled to the plurality of computers via the first network, and a controller, wherein said controller creates the logical storage area and assigns the logical storage area to a one of the plurality of ports coupled to the one of the plurality of computers via the first network in accordance with the instruction, wherein said information includes capacity information of a virtual storage area, wherein the management computer instructs said selected storage system to create the logical storage area which has a capacity in accordance with the capacity information by sending the instruction to the selected storage system via the LAN and sends information of said created logical storage area to said one of the plurality of computers via the LAN, wherein said one of the plurality of computers constructs the virtual storage area based on said information of said created logical storage area by using said logical storage area and uses said logical storage area as the virtual storage area via the first network, wherein the first network is a Fibre Channel (FC) network, wherein the management computer receives notification of completion of creation of the logical storage area from the selected storage system via the LAN and sends the information of created logical storage area including an identifier of the selected storage system used in the first network to the one of the plurality of computers via the LAN, and wherein the one of the plurality of computers access to the selected storage system via the FC network by using the identifier.

6. A computer system according to claim 5, wherein the identifier is a World Wide Name (WWN) used in a fibre channel protocol.

7. A computer system comprising:

a plurality of computers;

a plurality of storage systems coupled to the plurality of computers via a Fibre Channel (FC) network; and a management computer, coupled to the plurality of computers and the plurality of storage systems via a local area network (LAN), which includes a database including information of relation between a type of storage system and a program to be used for controlling a storage system belonging to the type, wherein one of the plurality of computers sends a command, which requests the management computer to create a logical storage unit, via the LAN, wherein the management computer selects a first storage system of the plurality of storage systems, identifies a first type of the first storage system, selects a first program used for controlling the first storage system by using the database and information of the first type, and sends a second command, which indicates the first storage system to create the logical storage unit, via the LAN by executing the first program, wherein the first storage system creates the logical storage unit in itself based on the second command and notifies the management computer of completion of creation via the LAN, wherein the management computer notifies the one of the plurality of computers of the completion of creation via the LAN, and wherein the one of the plurality of computers access to the first storage system via the FC network after receiving the notification from the management computer via the LAN.

8. A computer system according to claim 7, wherein said management computer instructs the first storage system to expand the logical storage unit by executing the first program.

9. A computer system according to claim 8, wherein said management computer instructs the first storage system to delete the logical storage unit by executing the first program.

10. A computer system according to claim 9, wherein the first storage system deletes the logical storage unit in accordance with the instruction provided by the management computer via the LAN and notifies the management computer of completion of deletion via the LAN, and wherein the management computer notifies the one of the plurality of computers of completion of deletion via the LAN.

11. A computer system according to claim 10, wherein the management computer receives notification of completion of creation of the logical storage unit form the first storage system via the LAN and sends information of created logical storage area including a World Wide Name (WWN) of the first storage system used in the FC network to the one of the plurality of computers via the LAN, and wherein the one of the plurality of computers access to the first storage system via the FC network by using the WWN.

12. A computer system according to claim 11, wherein the database includes information of relation between the type of a storage system and an identifier assigned to the storage system, and wherein the management computer identifies the first type of the first storage system based on a first identifier specific to the first storage system acquired from the first storage system via the LAN and the database.

13. A computer system, comprising:

a plurality of computers; and a plurality of storage system respectively coupled to each of said plurality of computers via a fibre channel (FC) network, wherein said plurality of computers include a management computer coupled to the plurality of computers and the plurality of storage systems via a local area network (LAN), wherein said management computer includes:

a processor, an interface coupled to the plurality of storage systems and the plurality of computers via the LAN, and a memory in which a plurality of programs for respectively controlling each of said plurality of storage systems are stored and in which a database including information indicating a relation between a type of storage system, a system identifier of the storage system and a program of the plurality of programs to be used for controlling the storage system identified by the system identifier, wherein said processor selects one of said plurality of storage systems to be controlled based on information including a system identifier having been allocated to each of said plurality of storage systems input to the management computer, specifies the selected storage system as being a type of storage system, selects one of said plurality of programs for controlling the selected storage system based on the information indicating a relation between the specified type of storage system, the system identifier of the storage system and the program, and executes the selected to control the selected storage system via the LAN, and wherein a one of the plurality of computers, which is assigned to the one of said plurality of storage systems, accesses to the one of the plurality of storage systems via the FC network.

* * * * *